Oct. 19, 1937. F. B. MILLER Re. 20,537
MECHANICAL HAMMER
Original Filed May 16, 1935 2 Sheets-Sheet 1
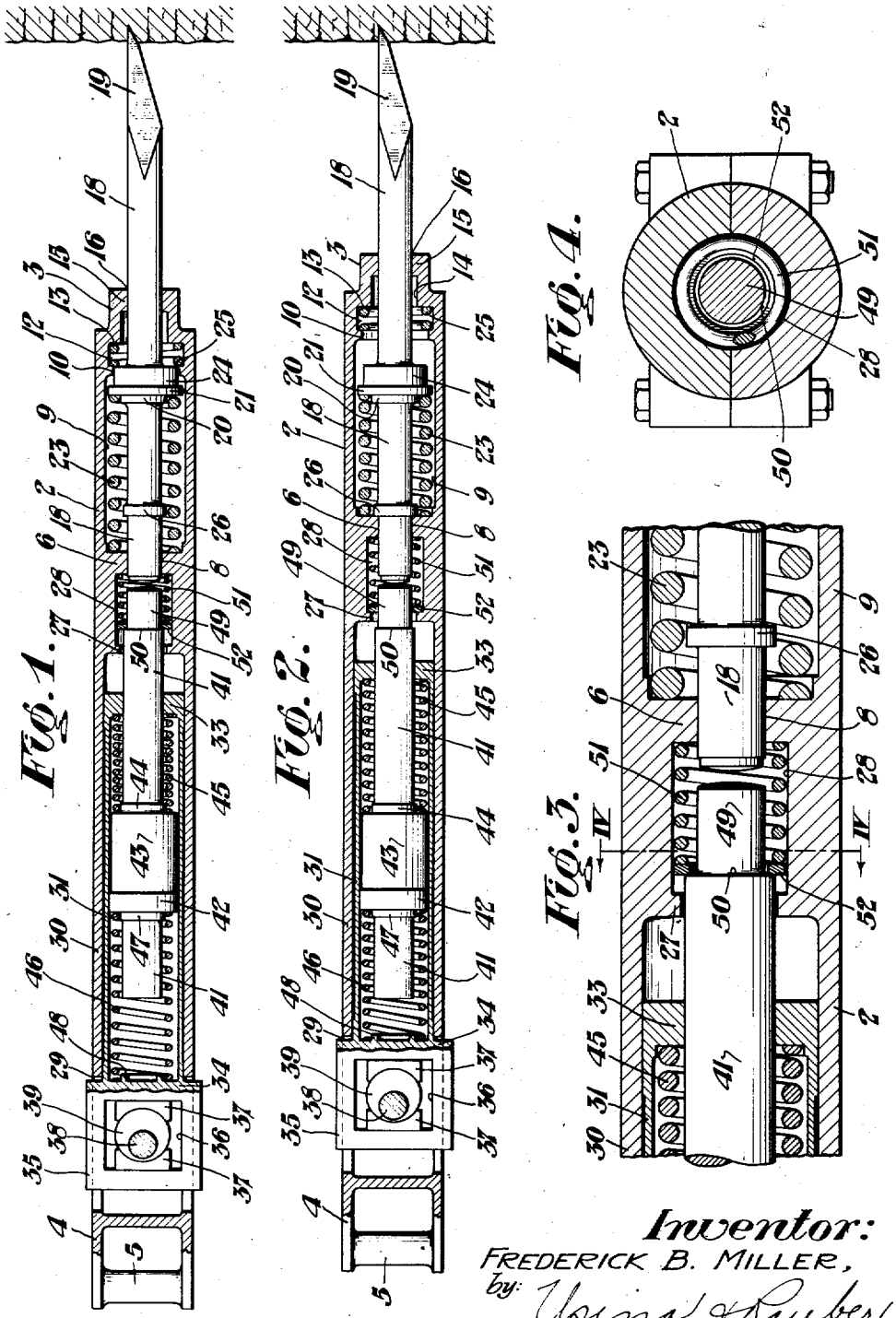
Inventor:
FREDERICK B. MILLER,
by: Usina & Rauber
his Attorneys.

Oct. 19, 1937. F. B. MILLER Re. 20,537

MECHANICAL HAMMER

Original Filed May 16, 1935 2 Sheets-Sheet 2

Inventor:
FREDERICK B. MILLER
by: Usina & Rauber
his Attorneys.

Reissued Oct. 19, 1937

Re. 20,537

UNITED STATES PATENT OFFICE 20,537

MECHANICAL HAMMER

Frederick B. Miller, Chicago, Ill.

Original No. 2,017,470, dated October 15, 1935, Serial No. 21,879, May 16, 1935. Application for reissue February 17, 1937, Serial No. 126,204

11 Claims. (Cl. 125—33)

The invention relates to mechanical hammers, or what are known as "picking bars", such as are used in mining operations and the like.

One of the most popular types of mechanical hammers, or picking bars, employs a housing, a resiliently mounted tool, such as a chisel, and a resiliently mounted "helve" which is driven through a cam to deliver rapid impacts, or impulses, to the tool. Considerable difficulty has been experienced in using devices of this type due to the fact that the velocity of the "helve", imparted by the cam, controls its limit, or throw. The cam must be constantly rotated at a uniform speed, otherwise the throw of the "helve" will not be uniform and will result in the striking of the tool shank when it is in its forward position. This necessary uniform speed of cam rotation is extremely difficult to maintain.

It is one of the objects of the present invention to provide a mechanical hammer employing a "helve" whose throw is limited independently of the speed of rotation of the cam by which it is operated.

Another object is to provide a novel mechanical hammer employing a system of springs which operate to absorb unspent forces of the "helve", thus assisting its return, and the consequent release from the "helve" spring of that amount of pressure, or energy, which is absorbed therein. This manner of operation conserves energy required for the reciprocation of the "helve" by its operating cam.

In accordance with the teaching of the present invention, the impetus lent the "helve" is augmented to create a throw which is greater than that of the cam, the length of which is dependent upon the speed of rotation of the latter.

Another object is to provide a novel device of the class described which may be easily and cheaply manufactured, and one which at the same time will prove very durable in service.

These and further objects will be apparent after referring to the accompanying drawings, in which:

Figure 1 is an elevation of the device of the invention shown partly in section;

Figure 2 is a view similar to Figure 1 but disclosing the various elements in another stage of operation;

Figure 3 is an enlarged fragmentary sectional elevation of a part of the device of the invention in the position indicated in Figure 1;

Figure 4 is a sectional view on the line IV—IV in Figure 3;

Figure 5:
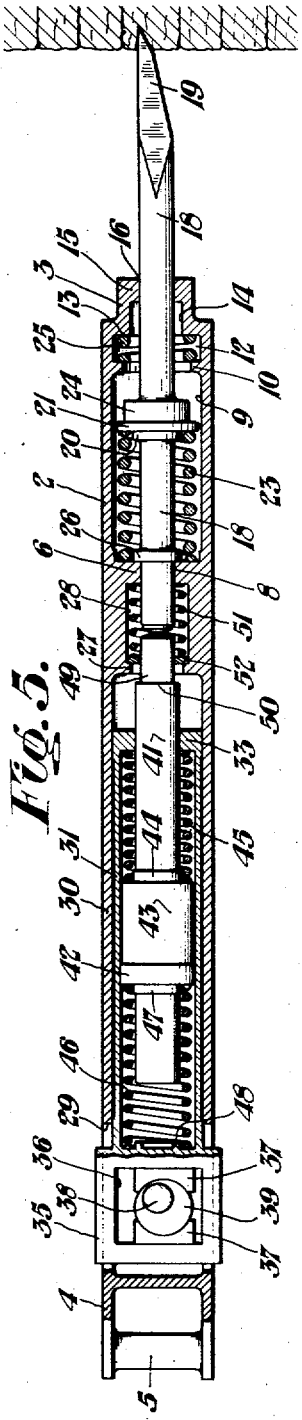
Figure 5 is a view similar to Figure 2 but disclosing the various elements in another stage of operation.

Referring more particularly to the drawings, the numeral 2 designates a substantially cylindrical housing for the various elements of the device of the invention which is provided on one of its ends with a reduced portion 3, while on the other end thereof is disposed the usual yoke 4, and handle 5, for enabling its easy handling by a workman.

The housing 2 is provided on its interior surface relatively adjacent its end having the reduced portion 3, with an inwardly extending flange 6, which is centrally apertured, as at 8. This inwardly extending flange 6 provides within the housing 2 a relatively short cylindrical chamber 9, which is partially closed on its end nearest the reduced portion 3 by an inwardly extending flange 10. Between the flange 10 and the reduced end 3 of the housing 2, the latter is provided with a relatively narrow annular groove 12, which terminates in a shoulder 13. A recess 14 of relatively small diameter opens on this shoulder 13 and terminates in a flange 15, which is centrally apertured, as at 16.

The tool shaft of the novel mechanical hammer of the invention is generally indicated as at 18, and is slidably mounted in the apertures 8 and 16 of the flanges 6 and 15, respectively. The extremity of the tool shaft 18 which protrudes from the housing 2 is provided with the usual cutting edge 19, or other medium, for promoting its effectiveness upon that which it is intended to operate. The substantial mid-portion of the tool shaft 18 is provided with an annular flange 20, and an adjoining retainer flange 21 of greater diameter. A coil spring 23 is disposed in the chamber 9 around the tool shaft 18 and in contact with the retainer flange 21 on the latter and the flange 6 of the housing 2.

The annular flange 20 serves to maintain the coil spring 23 against lateral movement on the tool shaft 18. A flange 24 is provided on the tool shaft 18 adjacent the retainer flange 21 and on the side of the latter which is opposite the annular flange 20. This flange 24 is of substantially the same diameter as that of the opening provided by the inwardly extending flange 10 of the housing 2. A coil spring 25 is disposed in the annular groove 12 and adapted to make contact on one of its ends with the adjacent side of the flange 24 and on its other end with the shoulder 13 on which the recess 14 opens.

The tool shaft 18 is provided on its end adjacent the flange 6 with a stop-flange 26 for preventing its excessive movement through the aperture 8.

The housing 2 is reduced in internal diameter adjacent the flange 6 and provided with an inwardly extending annular flange 27 to form a cylindrical chamber 28. The end of the substantially cylindrical housing 2 which is opposite the reduced end 3 is open, as shown at 29, and provides an elongated cylinder 30 between it and the flange 27.

A sleeve 31 is disposed for slidable movement in the elongated cylinder 30 in the housing 2. This sleeve 31 is provided on its end which is most adjacent the flange 27 with an inwardly extending annular flange 33. The other end of the sleeve 31 is closed, as at 34, and carries a frame 35 which has a substantial lateral opening 36 therein. A pair of bearing shoes 37 are disposed on diametrically opposite sides of the opening 36 in the frame 35 in the plane of the axis of the sleeve 31. A reciprocable shaft 38 is disposed to extend through the opening 36 in the frame 35 and carries an eccentrically mounted disk 39 which is adapted to constantly make contact with the shoes 37.

The shaft 38 is driven at a relatively high speed in any suitable manner in accordance with the teaching of the prior art.

A shaft 41 is slidably mounted in the aperture formed by the inwardly extending flange 33 on the sleeve 31 and is provided on its substantial mid-portion with an annular flange 42 and an adjacent relatively elongated cylindrical boss 43 of slightly smaller diameter. The shaft 41 is also provided with a flange 44 on the side of the elongated cylinder 43 which is opposite the flange 42. This shaft 41 in the sleeve 31 carries a coil spring 45 which makes contact on one of its ends with the adjacent side of the inwardly extending flange 33, while the other end thereof contacts the adjacent side of the elongated cylindrical boss 43. The annular flange 44 thus serves to center the coil spring 45.

A coil spring 46 is carried by the shaft 41 on the opposite side of the elongated cylindrical boss 43 and is centered by an annular flange 47 on the latter and a guide plug 48 on the adjacent side of the frame 35.

The end of the shaft 41 in the sleeve which is adjacent the inwardly extending flange 6 of the housing 2 is reduced in diameter as shown at 49, and made to extend into the cylindrical chamber 28. This reduced portion 49 of the shaft 41 provides a shoulder 50. A coil spring 51 is disposed in the cylindrical chamber 28 and maintained by means of a retaining washer 52 which contacts the adjacent side of the inwardly extending annular flange 27.

In operation the shaft 38 is constantly rotated with its eccentrically mounted disk 39 in contact with the shoes 37 in the frame 35, thus imparting reciprocation to the elongated sleeve 31. The shaft 41 is initially moved forwardly through the spring 46 in the sleeve 31. This movement is, however, resisted by the spring 45 in the elongated sleeve 31 and also the spring 51 in the cylindrical chamber 28, which is compressed by the shoulder 50 formed by the reduced portion 49 of the shaft 41. It is the function of the spring 23 in the housing 2 to absorb the initial thrust of the shaft 18 caused by maintaining the chisel 19 against the material to be worked upon. The shaft 18 is struck by the shaft 41 and moved forwardly with it, being assisted by the spring 23. There is not, however, sufficient thrust on the shaft 18 to compress the spring 23 sufficiently to maintain the former in its extreme rearward position, or within the striking range of the shaft 41. The shoulder 50, formed by the reduced end 49 of the shaft 41 contacts the retaining washer 52 in the cylindrical chamber 28 and compresses the spring 51, thereby forming a yielding resistance that limits the throw of the shaft 41 with its elongated cylindrical boss 43 which, taken together, form the "helve" or "hammer." The impetus lent the "helve" by the spring 46 creates a "helve-throw" greater than the "cam-throw", the length of which is dependent on the speed of rotation of the cam. The uniform throw of the "helve" is usually dependent upon constant or uniform speed of the cam rotation which is difficult to maintain, due to the usual power fluctuations. Therefore, to keep the movement of the shaft 18 within certain limits it is desirable to limit the throw of the "helve" to prevent its being struck at such time when it is in its forward position.

By means of the resistance imparted by the coil spring 51 the throw of the "helve" is controlled without maintaining a constant or uniform speed of cam rotation. Furthermore, the resistance imparted by the coil spring 51 absorbs unspent forces of the "helve" which assists in returning it, thereby relieving the coil springs 45 and 46 of the amount of pressure or energy absorbed in the former. This also conserves the energy required for reciprocating the "helve."

Figure 6:
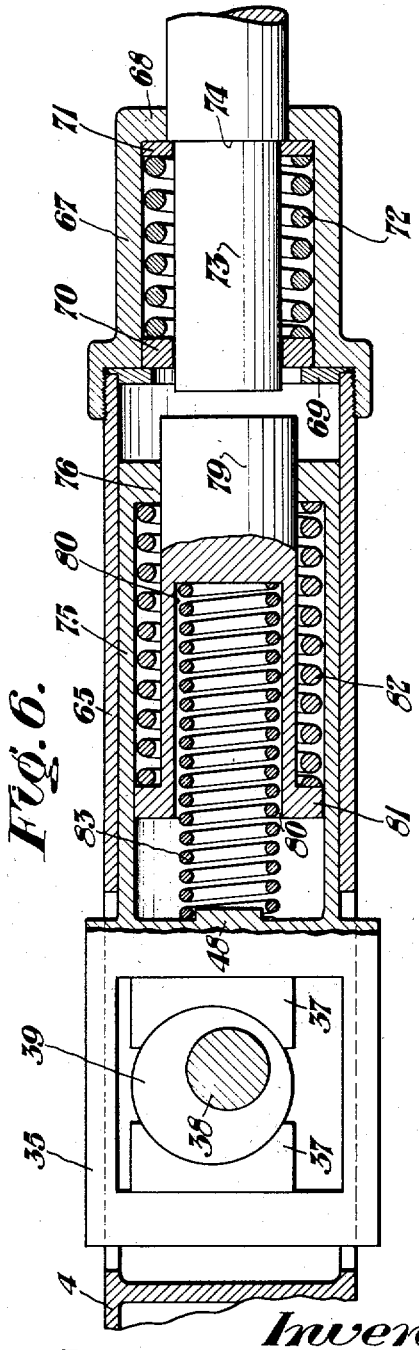
Figure 6 is a modification.

In Figure 6 of the drawings, I have disclosed a modified form of the device of the invention. According to this embodiment, the main portion of the housing is generally indicated at 65 as comprising a sleeve which carries on one of its ends an extension 67 of reduced diameter. The outer end of the extension 67 is provided with an inwardly extending annular flange 68. A washer 69 is disposed between the housing 65 and the extension 67 and serves to retain a ring 70 which is disposed within the latter. A similar ring 71 is disposed in the extension 67 against the inwardly extending annular flange 68. These rings 69 and 71 are maintained in separated position by a coil spring 72. A shaft 73 extends through the extension 67 and carries a shoulder 74 which is constructed to contact the ring 71. This shaft 73 is suitably retained and carries a tool (not shown).

A relatively shorter sleeve 75 is provided in the housing 65 of Figure 6 in lieu of the sleeve 31 in the housing 2 of Figures 1 through 5. This sleeve 75 is provided on its end adjacent the extension 67 with an inwardly extending annular flange 76. The "helve" of the embodiment of Figure 6 comprises a shaft 79 which has a cylindrical bore 80 in its end adjacent the frame 35. The opposite end of the shaft 79 reciprocates in the aperture provided by the inwardly extending annular flange 76, and is maintained in alignment therewith by an annular flange 81 on its end having the cylindrical bore 80 which is reciprocable within the housing 65.

A coil spring 82 is disposed within the sleeve 75 and around the shaft 79 This coil spring 82 makes contact on one of its ends with the inwardly extending annular flange 76 on the sleeve 75 and on its other end with the annular flange 81 on the shaft 79. A coil spring 83 is disposed to extend into the cylindrical bore 80 in the shaft 79 with its end seating on the bottom thereof. The other end of the coil spring 82 seats against the adjacent side of the frame 35 and is maintained in position by the guide plug 48, all as in the embodiments of Figures 1 through 5.

The mode of operation of the modification of Figure 6 is substantially the same as that previously described. That is to say, the coil spring 72 in the extension 67 functions in the same manner as the coil spring 51 in the cylindrical chamber 28, while the springs 82 and 83 function in the same manner as the springs 45 and 46. The remaining elements of both embodiments are identical, the sole purpose of the modification being to reduce the over-all length for operations within confined quarters.

While I have shown and described several specific embodiments of my invention, it will be understood that I do not wish to be limited exactly thereto, since various modifications may be made without departing from the scope of my invention, as defined in the following claims.

What is claimed is:

1. A mechanical hammer comprising a housing, an operating shaft reciprocably mounted in said housing, said shaft being spring-pressed in opposite directions, a helve reciprocably mounted in said housing and in alignment with said operating shaft, said helve being spring-pressed in opposite directions and constructed and arranged to contact the adjacent end of the said operating shaft, means for reciprocating said helve, and resilient means backed by said housing and providing yielding resistance for decelerating the movement of the helve at one end of its stroke to thereby control the velocity of said helve.

2. A mechanical hammer comprising a housing, an operating shaft reciprocably mounted in said housing, said shaft being spring-pressed in opposite directions, a sleeve reciprocably mounted in said housing, a helve reciprocably mounted in said sleeve and in alignment with said operating shaft, said helve being spring-pressed in opposite directions and constructed and arranged to contact the adjacent end of said operating shaft, means for reciprocating said sleeve, and resilient means backed by said housing and providing yielding resistance for absorbing the impact of the helve near the end of its reciprocation in one direction to thereby control the velocity of said helve.

3. A mechanical hammer comprising a housing, an operating shaft reciprocably mounted in said housing, said shaft being spring-pressed in opposite directions, a helve reciprocably mounted in said housing and in alignment with said operating shaft, said helve being spring-pressed in opposite directions and constructed and arranged to contact the adjacent end of said operating shaft, means for reciprocating said helve, and resilient means backed by said housing and providing yielding resistance for absorbing unspent forces of the helve in one direction of its reciprocation which thereby assists in returning the helve.

4. A mechanical hammer comprising a housing, an operating shaft mounted for reciprocating movement in said housing, a helve reciprocably mounted in said housing and in alignment with said operating shaft, said helve being spring pressed in opposite directions and constructed and arranged to contact the adjacent end of said operating shaft, means for reciprocating said helve, and resilient means backed by said housing and providing yielding resistance for decelerating the movement of the helve at one end of its stroke to thereby control the velocity of said helve.

5. A mechanical hammer comprising a housing, an operating shaft mounted for reciprocating movement in said housing, a sleeve reciprocably mounted in said housing, a helve reciprocably mounted in said sleeve and in alignment with said operating shaft, said helve being spring pressed in opposite directions and constructed and arranged to contact the adjacent end of said operating shaft, means for reciprocating said sleeve, and resilient means backed by said housing and providing yielding resistance for absorbing the impact of the helve near the end of its reciprocation in one direction to thereby control the velocity of said helve.

6. A mechanical hammer comprising a housing, an operating shaft mounted for reciprocation in said housing, a helve reciprocably mounted in said housing and in alignment with said operating shaft, said helve being spring pressed in opposite directions and constructed and arranged to contact the adjacent end of said operating shaft, means for reciprocating said helve, and resilient means backed by said housing and providing yielding resistance for absorbing unspent forces of the helve in one direction of its reciprocation which thereby assists in returning the helve.

7. In a mechanical hammer, a housing, a reciprocating sleeve within said housing, a hammer member having connection with said sleeve by means of resilient springs arranged so as to yieldingly oppose movement of said hammer member relative to the sleeve, and other yielding means comprising a coil spring located in the housing in alignment with the hammer member and providing resistance for controlling the velocity of said hammer member by absorbing the impact of the hammer member near the end of its reciprocation in one direction.

8. In a mechanical hammer, a housing, a reciprocating sleeve within said housing, a hammer member having connection with said sleeve by means of springs arranged so as to yieldingly oppose relative movement of the hammer member with respect to the sleeve, whereby the travel of said hammer member will be greater than that of said sleeve, and a resilient coil spring located in the housing in alignment with the hammer member and providing yielding resistance for decelerating said hammer member at one end of its stroke, whereby the travel of the hammer member is controlled without maintaining uniform reciprocating movement of said sleeve.

9. In a mechanical hammer, a housing, a sleeve mounted for reciprocating movement within said housing, a helve having connection with said sleeve by means of springs arranged so as to yieldingly oppose relative movement between the helve and sleeve, means for reciprocating said sleeve to produce reciprocating movement of said helve imparted thereto through said springs, a tool shank slidable in said housing and adapted to receive blows from said helve, and a resilient coil spring backed by said housing and providing yielding resistance adapted to assist in restricting the reciprocating movement of the helve in that direction toward said tool shank.

10. In a mechanical hammer, a housing, a reciprocating sleeve within said housing, a helve in said sleeve and connected therewith by means of springs arranged so as to yieldingly oppose relative movement of the helve with respect to the sleeve, means for reciprocating said sleeve, the throw of said helve being greater than that of the sleeve by reason of the resilient mounting of the helve in the sleeve, an operating shaft mounted for reciprocation in the housing, said shaft being positioned to receive blows from said helve, and a resilient coil spring located in the housing in alignment with the helve and providing yielding resistance for decelerating said helve at the end of its stroke toward said operating shaft, whereby said resilient means controls the throw of the helve and maintains the same uniform irrespective of the velocity of the sleeve.

11. A mechanical hammer comprising a housing, a helve mounted for reciprocating movement in said housing, means for reciprocating said helve, said helve being spring pressed in opposite directions and arranged so that said reciprocating movement is imparted thereto through said springs, and resilient means backed by said housing and providing yielding resistance for decelerating the movement of said helve at one end of its stroke.

FREDERICK B. MILLER.